Sept. 25, 1962 P. P. MARTINELLI 3,056,027
APPARATUS FOR MEASURING THE THICKNESS OF A DEPOSIT
Filed April 22, 1959 3 Sheets-Sheet 1

INVENTOR
PIERRE PASCAL MARTINELLI
BY

ATTORNEY

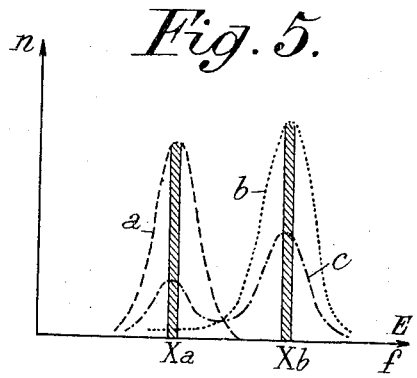
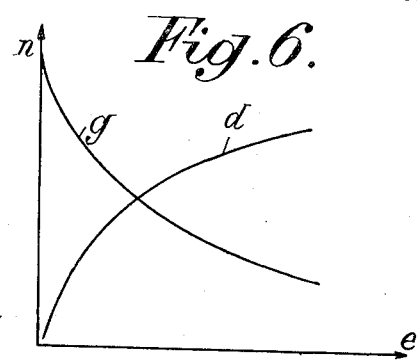
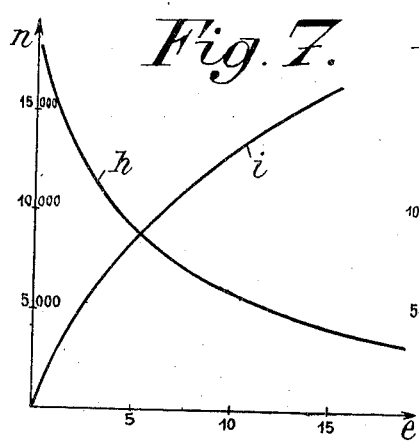
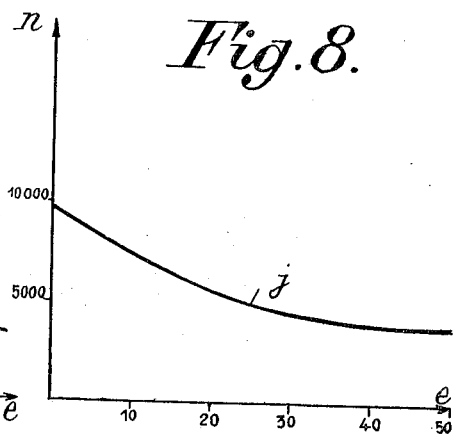
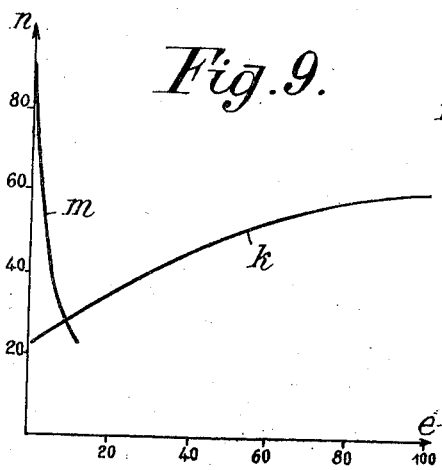
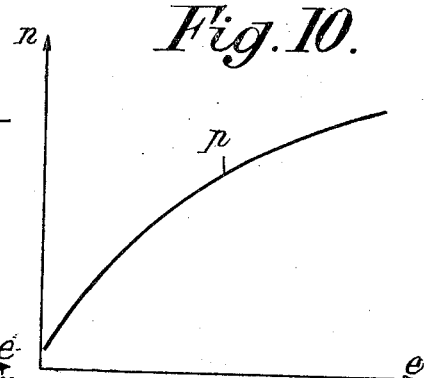

United States Patent Office 3,056,027
Patented Sept. 25, 1962

3,056,027
APPARATUS FOR MEASURING THE THICKNESS OF A DEPOSIT
Pierre Pascal Martinelli, Paris, France, assignor to Commissariat a l'Energie Atomique, Paris, France
Filed Apr. 22, 1959, Ser. No. 808,062
Claims priority, application France Apr. 12, 1955
9 Claims. (Cl. 250—83.6)

The present invention relates to an apparatus for measuring the thickness of a deposit, either metallic or not.

The chief object of my invention is to simplify the means necessary for said measurement.

The non-destructive measurement of the thickness of a layer is of a very great importance, in particular for metallic deposits. It is generally difficult for deposits of nonferromagnetic metals on substances which are also nonferromagnetic.

According to my invention, such an apparatus for measuring the thickness of a deposit of a material formed on a support of another material comprises means for projecting a beam of beta rays onto said deposit, means for selectively measuring the intensity of the radiations transmitted thereto from said deposit and said support that range in a narrow frequency band containing an X-ray characteristic of one of said materials, and means interposed between said deposit and said measuring means to prevent beta rays from reaching said measuring means.

According to a first embodiment of my invention, the means for preventing beta rays from reaching the measuring means are constituted by a screen which stops said beta rays.

According to another feature of the invention, said means for preventing beta rays from reaching said measuring means are means for producing a magnetic field between the deposit and the measuring means so as to deflect the beta rays from the path leading to the measuring means.

The thickness of the layer to be measured must be smaller than the maximum distance that beta rays can travel over in the matter which constitutes said layer. For great thicknesses, this maximum path will be increased by making use of a very hard beta radiation. For small thicknesses, a less intensive radiation will be used, which will permit of improving the sensitiveness of the device.

Preferred embodiments of the present invention will be hereinafter described with reference to the accompanying drawings given merely by way of example and in which:

FIG. 5 shows the respective X-fluorescence radiation spectrums emitted by the material of the support, the metal of the deposit and the support provided with a thin layer of the deposit.

FIG. 6 shows the variation of the activity measured for the characteristic X-rays of the metal of the support on the one hand, and of the deposit metal on the other hand, as a function of the thickness of the deposit.

FIGS. 7 to 10 are curves indicating each, for a given metal forming the deposit and a given metal forming the support, the activity measured as a function of the thickness of the deposit.

Figure 1:
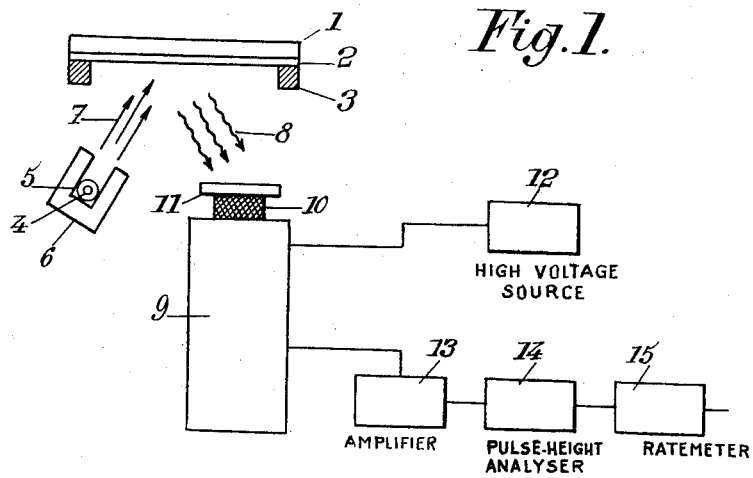
FIG. 1 shows an apparatus for measuring the thicknesses of metallic deposits.

In the apparatus illustrated by FIG. 1, a sample constituted by a support carrying the metal deposit the thickness of which is to be measured consists of a plate 1 carrying the metal deposit 2. The whole is mounted in a holder 3.

According to my invention, a source 4 of beta rays is located close to plate 1 on the side thereof which carries the metal deposit 2.

The source 4 is a radioactive isotope and this isotope is then enclosed in a cylinder 5 of a light metal, for instance aluminium or a plastic material capable of resisting the radiation, this cylinder being itself placed in a protective container 6.

The beta rays shown by arrows 7 and coming from source 4 irradiate the metallic deposit 2 which, in turn, emits an X-radiation represented by the wave-shaped arrows 8.

The X-radiation 8 is detected and amplified by a photomultiplier tube 9 fed from a high voltage stabilized source 12, this tube 9 including for instance a crystal 10 of sodium iodide activated by means of thallium.

A screen 11 of a light material (for instance a plastic material, aluminium, beryllium), intended to stop the parasitic beta rays due to braking of the electrons which constitute the incident beta rays and to retrodiffusion thereof by the metallic deposit 2 and the surrounding objects, is located across the path of travel of the X-rays ahead of the photomultiplier tube 9.

Connected with this photomultiplier tube 9 there are an amplifier 13, a filter 14 for selecting a given wavelength and counting means 15. Amplifier 13 serves to amplify the effects of the radiation of the metal which constitutes the deposit 2; filter 14 selects the desired energies (frequencies) and counting means 15 permit of determining the thickness of the deposit, in accordance with the intensity measured by said counting means.

The means 15 for counting the intensities or activities (that is to say the numbers of impulses received in the apparatus per unit of time) may for instance consist of a scaling circuit, a counting rate meter, or an integrator, capable of summing up the various activities corresponding to the band selected by filtering means 14. Advantageously, use is made of an apparatus permitting a direct reading of the thicknesses of the deposit 2.

Comparison with a standard apparatus permits of periodically checking up the adjustment of the measurement apparatus and of readjusting it if necessary.

Figure 2:
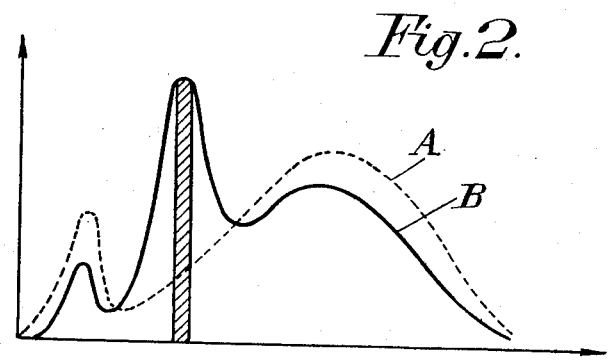
FIG. 2 shows the spectrum of the X-radiations emitted on the one hand by the metal of the support of the deposit and on the other hand by this metal support provided with its deposit.

On FIG. 2 I have shown the spectrum of the X-radiation that is detected. On this curve, the frequencies or energies are plotted in abscissas. In ordinates are plotted, for each band to which the filter 14 is successively tuned, the corresponding value of the activity. By varying the adjustment of filtering means 14, the whole range of energies (or frequencies) is scanned and the curve is traced.

Curve A relates to the radiation obtained with the support 1 alone. Curve B relates to the same radiation with a metal deposit applied on said support.

In order to trace the curves, the filtering means 14 are successively tuned to all the energies (or frequencies) of the X-rays that are detected, which indicates one or several X-rays characteristic of the matter of the deposit and having a relatively intense activity as compared with the remainder of the spectrum.

I then choose one of these rays and I adjust filtering means 14 so that it may permit the transmisison through a narrow band including said rays. The activity of this band is measured, this activity corresponding to the cross-hatched region of curve B.

This activity is much higher than that corresponding to the support alone, and it depends upon the thickness of the deposit.

Since the nature of the deposit is often known, it is possible to know in advance the energy (or frequency) of one of the characteristic X-rays thereof, which facilitates selection. The filtering means may even be left adjusted to correspond to a well determined ray if a whole series of measurements corresponding to deposits of the same nature is effected.

Figure 3:
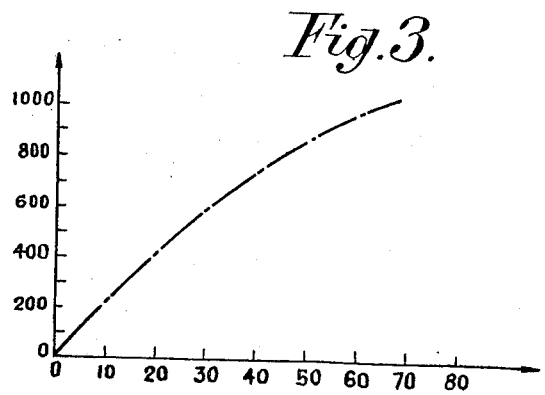
FIG. 3 shows, by way of an example, a curve indicating, for a given metal deposit, the activity measured by the apparatus in accordance with the thickness of the deposit.

FIG. 3 shows the type of curve which indicates, for a given support 1 carrying a given metal deposit, the activity measured by the apparatus in accordance with the thickness of the deposit. This curve is made by plotting in abscissas the thickness of the deposit and in ordinates the activity of the X-radiation.

By way of example, the curve of FIG. 3 was obtained experimentally by making use of a support constituted by a copper plate carrying a gold deposit of variable thickness. I used a source of beta rays constituted by strontium 90 the period of which is twenty-five years, this strontium being placed in an aluminium cylinder, itself placed inside a bismuth container. The detecting means consisted of a photomultiplier provided with a crystal of sodium iodide activated by means of thallium. The screen placed at the input end of said photomultiplier was made of a plastic material. The passing-band of the filtering means had a width of 10 kiloelectron volts. The apparatus further included an integrator and a registering electronic potentiometer.

The curve of FIG. 3 relates to this example. The activity plotted in ordinates was counted in number of impulses per minute. The thickness of the deposit, plotted in abscissas, was counted in microns.

The means used for making the apparatus according to my invention are extremely simple and it is possible to make use of long period radioactive sources. Furthermore it is possible to eliminate practically the whole of the parasitic radiation coming from the braking of the electrons which constitute the beta radiation and from their retrodiffusion into the piece that is examined and the surrounding objects.

The apparatus above described gives very good results for measuring the thickness of deposits of a metal on another metal when on the one hand at least one of the two metals has a sufficiently high atomic number, for instance higher than 40, and on the other hand the atomic number of the deposited metal differs by more than two or three units from the atomic number of the metal forming the support.

On the contrary, if both of the metals in question have an atomic number lower than 40, the use of the above desescribed embodiment of the invention becomes rather delicate. This is due to the fact that the screen intended to absorb beta rays also absorbs a substantial amount of X-rays and the photomultiplier is no longer able to measure, in satisfactory conditions, the X-rays characteristic of such metals (K-rays). Furthermore, if the atomic number of the deposit is little different from that of the support, the X-rays of the fluorescence excited by the beta rays in the metal forming the support and in the metal forming the deposit have energies (or frequencies) which are too close to each other to be distinguished from each other by the detecting device constituted by a photomultiplier.

In these conditions, it has been found particularly advantageous to make use, as means for preventing beta rays from reaching the measuring or detecting means, of a device capable of forming a magnetic field which deflects said beta rays from the path leading to said measuring or detecting means.

It then becomes possible to measure the thickness of a deposit of a material having an atomic number lower than 40, deposited upon a support of a material having an atomic number also lower than 40.

Besides, it should be noted that, in the case of a magnetic separation of the beta rays, which does not weaken the X-ray transmission, the characteristic X-ray that is measured may be as well that of the metal of the support as that of the metal of the deposit. This is possible because, in this case, the X-rays that are transmitted from the metal of the support are sufficient to permit intensity measurements in excellent conditions.

Figure 4:
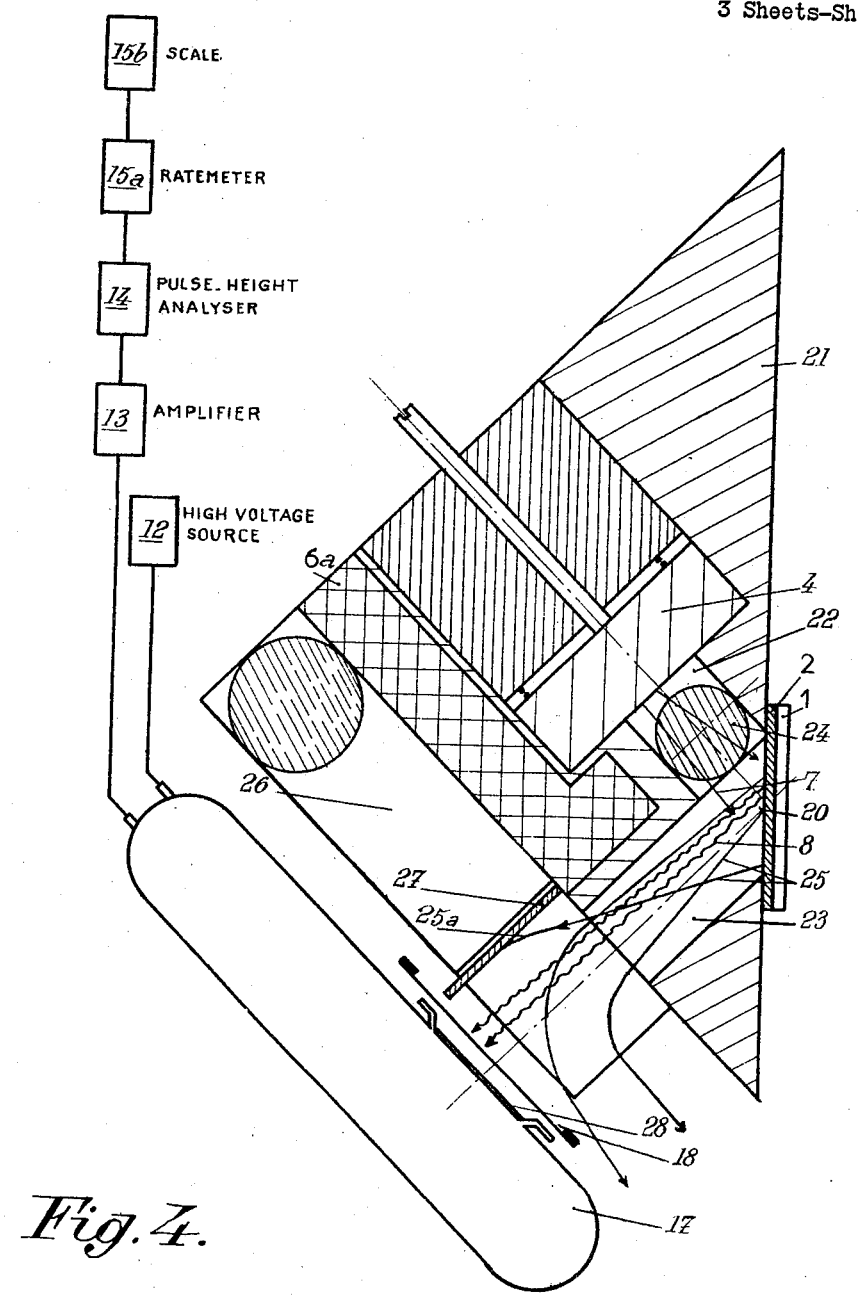
FIG. 4 is a sectional view of an apparatus made according to a second embodiment of the invention.

On FIG. 4 I have shown a sample constituted by a deposit 1 formed on a support 2, this sample being mounted on the aperture 20 of a unit 21 having in cross-section the shape of a rectangular triangle, this unit being made of a material having a low atomic number and being provided with two conduits 22 and 23 at right angles to each other and both leading to aperture 20.

Unit 21 contains, opposite conduit 22, a source 4 of beta rays, advantageously constituted by at least one radioactive isotope, such as strontium 90 (possibly with the addition of yttrium 90) the period of which is twenty-five years, which supplies a beam of high energy electrons the intensity of which decreases very slowly as a function of time, so that the necessity of frequent adjustments of the apparatus is avoided. As in the first embodiment above described, the source of beta rays is placed in a container of a light material such as beryllium, aluminium or alumina, the narrow aperture through which the beta rays issue from the source being also covered by such a material. A protection plate 6a, made of a material having a high atomic number, for instance lead, protects the gas filled radiation counter 17 against Bremsstrahlung radiations produced by the source itself in the vicinity thereof. Furthermore, a safety rod 24 permits of closing conduit 22 during the periods of time between two measurements, whereby the operator is protected against direct radiations from the source 4 passing through aperture 20 when the sample 1, 2 is withdrawn.

The beta rays (shown by the arrows 7 in dotted lines) emitted from source 4 are limited by conduit 22 and irradiate the metallic deposit 2, and also the support material 1. Deposit 2 and support 1 emit on the one hand, by X-fluorescence effect, characteristic X-rays illustrated by the wavy arrows 8, and on the other hand retrodiffuse electrons forming beta rays shown by the solid line arrows 25, the whole passing through channel 23 toward counter 17.

The retrodiffused beta rays 25 and the fluorescence X-radiation 8 are separated by a magnetic field, for instance by a permanent magnet 26 in the form of a horse shoe, which deflects the beta rays 25 as shown.

Of course, such a magnet might be replaced by electromagnets.

I further provide, advantageously, a screen 27 of a light material, such as aluminium, in order to stop the retrodiffused electrons such as 25a, which might reach the window 28 of counter 17.

On the contrary, the X-rays, such as 8, are neither deflected nor attenuated and after passing through window 28 they are detected by the gas filled radiation counter 17 which is advantageously a proportional counter.

Preferably, this proportional counter has a thin window (for instance constituted by a sheet of beryllium of 0.1 mm.) of the type generally used for the spectrometry of soft X-rays. This counter contains a high proportion of a rare gas, such as argon (in particular to detect characteristic X-rays having an energy ranging from 3 to 10 kev.), krypton (particularly to detect characteristic X-rays having an energy higher than 10 kev.), or xenon (particularly to detect the characteristic X-rays of heavy elements). For instance, I may use one of the following mixtures to fill counter 17:

90% argon–10% propane
90% krypton–10% propane
Xenon or neon with some percents of a polyatomic gas other than propane In counter 17, the gas mixture must be at a pressure ranging from 100 to 800 mm. of mercury to have a sensitivity and selectivity as good as possible. As a matter of fact, if the pressure is too low, the efficiency of detection is reduced and a radiation is produced toward the outside of the counter in the form of X-rays characteristic of the gas filling the inside of the tube of the counter, which produces a loss of energy of the incident rays which lowers the number of impulses delivered by the counter; furthermore, a characteristic X-ray of this gas might have a detrimental action if it were located within the band of X-ray energies that must be detected by the counter, that is to say the X-ray energies characteristic of support 1 or deposit 2. On the contrary, if the pressure of the gas is too high, the counter is not so selective because it becomes sensitive to parasitic X and gamma rays of high energy, in particular to the radiation resulting from the braking of the beta rays of the radioactive source, which increases the background and reduces the accuracy.

The output of proportional counter 17, fed from a stabilized high voltage source 12, is connected successively to an amplifier 13, an amplitude selector 14 with a single channel, a rate meter 15a and a counting scale 15b; of course, said counting scale might be replaced by other means, for instance a milliammeter or a potentiometric recorder of the Meci-Speedomax type (Leeds & Northrup license) containing a bridge circuit with a control by means of an electric motor of the sliding element of a potentiometer, to balance said bridge, including a standard battery and a stylus.

Elements 13, 14, 15a and 15b serve rsepectively to amplify the energies corresponding to the X-rays characteristic of the metals which constitute the deposit and the support, to select these energies, to integrate the selected impulses and finally to give the measurement of their intensities which are monotonic functions of the thickness of the deposit which is to be measured, the final indicator apparatus being possibly graduated directly in thicknesses. As a matter of fact, the whole of detector 17 and electronic elements associated therewith constitutes an X-ray spectrometer.

According to another feature of the invention, this spectrometer may be improved by disposing, for certain measurements, a filter 18 just in front of the window 28 of counter 17 so as to separate the X-rays characteristic of support 1 and of deposit 2, when the atomic numbers thereof are too close to each other to be possibly separated by selector 14.

For this purpose, filter 18 is made of a metal or contains a metal (filter of a thin film of a plastic material, such as expanded polystyrene contained between two sheets of polyethylene impregnated with a metallic salt, when it is too difficult or practically impossible to make a sufficiently thin sheet of the metal to constitute the filter, which is for instance the case for chromium or cobalt) the K absorptoin discontinuity of which is intermediate, from the energetic point of view, between the respective X-rays emitted by the support 1 and the deposit 2, in such manner as wholly to absorb the X-rays having the higher energy and to permit only the X-rays of lower energy to pass, these last mentioned X-rays being detected by counter 17.

Such filters further permit of measuring the thickness of superimposed deposits, provided however that the outer deposits have a thickness lower than a given limit, which can be easily measured experimentally in every case, so as to permit a sufficient penetration of the beta rays which serve to the irradiation. I thus measure the thickness of superimposed deposits by making use of a series of suitable metallic filters, of given thickness, which select the different X-rays characteristic of these deposits and of the metal of the support.

For instance, a nickel sheet of a thickness equal to 0.01 mm. constitutes a suitable filter to measure the thickness of zinc deposits on a support of copper; a film of plastic material impregnated with a chromium salt or a cobalt salt constitutes a filter for separating the characteristic rays of chromium and iron or nickel and copper, respectively.

According to a modification, when, due to a suitable choice of the gas that fills the tube of the counter and of the pressure of this gas, one has succeeded in obtaining a detecting device the efficiency of which is very different for the characteristic X-rays of the material constituting the deposit and of the material constituting the support, respectively, this counter may be of the Geiger-Müller type. In this case, selection of the X-rays is effected by the counter itself, so that it is no longer necessary to provide an amplitude selector. Of course, the use of such a particular Geiger-Müller counter (the gas of which consists of argon and krypton and the window of which is very small, of the type of Geiger-Müller counters for X-rays) is limited to the measurement of the thicknesses of particular deposits and the same counter cannot, without being modified, be adapted to the measurement of thicknesses of other deposits. But the use of a Geiger-Müller counter, when it is possible, considerably simplifies the apparatus.

It is also possible, in some particular cases, to make use of a simplified counting device, avoiding the use of a single channel amplitude selector, owing to the employment of suitable selecting filters 18.

Of course, in all cases, the energy of the beta rays emitted by source 4 must be sufficient to enable these rays to pass through the layer of deposit 2 the thickness of which is to be measured.

The curves of FIGS. 5 to 10 illustrate the application of the invention according to the embodiment of FIG. 4.

On FIG. 5, I have plotted in abscissas the energies E (or frequencies $f$) of the X-rays generated by fluorescence effect in the materials forming the support and the deposit, and in ordinates the activity expressed by the number $n$ of counts per minute, measured by counter 17 and the electronic means 13, 14, 15a, 15b combined therewith, within a range of energies or frequencies, determined by the channel of selector 14. On this FIG. 5:

$a$ represents the curve relative to the X-rays detected for a zero thickness of the deposit (that is to say for a sample constituted merely by the metal of the support 2 the X-ray characteristic of which is in the band $Xa$);

$b$ is the curve relative to a very high thickness of the deposit (for instance 100 microns) and which may be considered as infinite, due to the fact that the beta rays do not pass therethrough, the X-ray characteristic of the material of the deposit being located in the band $Xb$; and $c$ is the curve relative to a deposit of the thickness of some microns.

On FIG. 6, I have plotted in abscissas the thicknesses $e$ of the deposit and in ordinates the activities measured by the number $n$ of counts per minute. The curve of FIG. 6 shows the variation of the intensity of the X-rays characteristic of the material of the deposit (curve $d$) or of the material of the support (curve $g$), that is to say in bands $Xb$ and $Xa$, respectively.

It will be readily understood that, by adjusting the energy band that is passed by selector 14 so that it corresponds either to the energy band $Xb$ or to the energy band $Xa$, it is possible easily to determine the thickness of the layer because curves $g$ and $d$ are monotonic curves, that is to say to every value of the thickness $e$ of the deposit, there corresponds a value of the activity $n$ measured in one of said bands, for instance expressed in counts per minute. It is thus possible to determine the curve $d$ or $g$ so as to obtain the thickness $e$ of the deposit as a function of the number $n$.

The curves, on which the thicknesses $e$ in microns are plotted in abscissas and the numbers $n$ of counts per minute are plotted in ordinates, give some particular examples of application of the invention.

The curves $h$ and $i$ of FIG. 7 correspond in particular to a deposit of chromium (the atomic number of which is 24) of a thickness $e$, in microns, on a plate of copper (the atomic number of which is 29), curve $h$ showing the increase of the activity measured on the K-rays (merged by selector 14 into a single ray) characteristic of chromium, whereas curve $i$ indicates the reduction of the activity measured by the whole of the K-rays that are characteristic of copper. These curves have been obtained with a detector 17 constituted by a proportional counter having an inner diameter of 9 cm., having a lateral window, filled with a mixture containing 90% of argon and 10% of propane under a pressure of 1050 kg./sq. cm., without making use of a filter 18 and with a source of strontium 90 and yttrium 90 of 10 millicuries.

In this case, and with either curve $h$ or curve $i$, it is possible to measure, in about one minute and with an approximation of 2%, a chromium thickness of one micron deposited on copper and with an approximation of 5% the thickness of deposits of chromium of values ranging up to 20 microns. With the same device without filter 18, it is possible to measure zinc deposits (atomic number 30) on iron (atomic number 26) with the same accuracy up to thicknesses of about 50 microns.

The curve $j$ of FIG. 8 corresponds to the measurement of zinc deposits (atomic number 30) on copper (atomic number 29). In this case, a filter 18 is necessary. Curve $j$ has been made with a nickel filter (atomic number 28) of a thickness equal to 0.01 mm. with the same source of 10 millicuries and by making use of a proportional counter. It is thus possible to measure a thickness of 30 microns of zinc with an approximation of 0.7 micron.

On FIG. 9, I have shown on the same scale the curves obtained by applying the method according to the first embodiment (curve $k$) with a screen of "Plexiglas" (methylmethacrylate) in order to stop the retrodiffused beta rays and a scintillation counter on the one hand, and with the apparatus according to the second embodiment (curve $m$) with a magnetic separation of the retrodiffused beta rays and a proportional counter on the other hand, for deposits of various thicknesses of gold (atomic number 79) on copper (atomic number 30). Curve $k$ corresponds to the X-ray characteristic of gold and curve $m$ to the X-ray characteristic of copper because, in this case, both of the above described modifications can be used.

It will be noted that if curve $k$ is more advantageous for thick deposits, on the contrary curve $m$ ensures a higher accuracy for thin deposits. It is thus possible to measure a deposit of 1 micron of gold on copper with an approximation of 0.04 micron, the accuracy being 0.5 micron with the first above described embodiment, which permits of measuring thicknesses up to 100 microns of gold with an approximation of 1 micron.

Finally, FIG. 10 shows the curve $p$ which permits with my invention, of measuring the thickness of deposits in the case of tinned iron, cadmium coated iron, chromized iron (by adjusting the channel of selector 14 to correspond to the band of energies of the X-rays characteristic of the deposited metal and by making use of a selecting filter in the case of chromized iron). Such measurements are hardly possible with the apparatus according to the first embodiment above described.

This application is a continuation-in-part of my application of April 11, 1956, Ser. No. 577,574, entitled: "Method and Apparatus for Measuring the Thickness of a Deposit," now U.S. Patent No. 2,967,934, granted January 10, 1961.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An apparatus for measuring the thickness of a deposit of one material formed on a support of another material which comprises, in combination, means for projecting a beam of beta rays onto said deposit, means for selectively measuring the intensity of the radiations transmitted thereto from said deposit and said support that range in a narrow frequency band containing an X-ray characteristic of one of said materials, and means for producing a magnetic field between said deposit and said measuring means to prevent beta rays retrodiffused by said deposit and said support materials from reaching said measuring means.

2. An apparatus for measuring the thickness of a deposit of one material formed on a support of another material which comprises, in combination, means for projecting a beam of beta rays onto said deposit, means for detecting the X-rays emitted from said deposit, means for producing a magnetic field between said deposit and said detecting means to prevent parasitic beta rays retrodiffused by said deposit and said support materials from reaching said detecting means, and means connected with the output of said detecting means for measuring the intensity of the radiations received at said detecting means that range in a narrow frequency band containing an X-ray characteristic of one of said materials.

3. An apparatus according to claim 2 in which said detecting means is a proportional counter.

4. An apparatus according to claim 2 in which said detecting means is a proportional radiation counter filled with a gas mixture containing a high proportion of a rare gas and under a pressure ranging from 100 to 800 mm. of mercury.

5. An apparatus according to claim 1 in which said measuring means include a Geiger-Müller counter, a rate meter connected to the output of said counter and a scale connected to the output of said rate meter.

6. An apparatus for measuring the thickness of a deposit of one material formed on a support of another material which comprises, in combinaiton, means for projecting a beam of beta rays onto said deposit, means for selectively measuring the intensity of the radiations transmitted thereto from said deposit and said support that range in a narrow frequency band containing an X-ray characteristic of one of said materials, means for producing a magnetic field between said deposit and said measuring means to prevent beta rays retrodiffused by said deposit and said support materials from reaching said measuring means, and a thin filter interposed between said deposit and said measuring means just in front of said measuring means, said filter containing atoms of a metal having a K absorption discontinuity for X-rays ranging in a frequency band intermediate between the respective frequencies of the X-rays characteristic of said two materials.

7. An apparatus according to claim 6 in which said filter is constituted by a very thin metal sheet.

8. An apparatus according to claim 6 in which said filter is constituted by a thin film of a plastic material impregnated with a metallic salt.

9. An apparatus according to claim 1 in which the source of beta rays is constituted by at least one radioactive isotope having a long period.

References Cited in the file of this patent

UNITED STATES PATENTS

| | | |
|---|---|---|
| 2,521,772 | Beeghly | Sept. 12, 1950 |
| 2,711,480 | Friedman | June 21, 1955 |
| 2,723,351 | Garrison et al. | Nov. 8, 1955 |
| 2,897,371 | Hasler | July 28, 1959 |

(Other references on following page)

2,903,590 Somerville _____ Sept. 8, 1959
2,933,606 Foster et al. _____ Apr. 19, 1960

OTHER REFERENCES

Beeghly: An X-Ray Method for Determining Tin Coating Thickness on Steel, Journal of the Electrochemical Society, April 1950, pages 152 to 157.

Hays: Continuous Measurement of Zinc Coatings Applied in a Continuous Coating Process, presented at the 31st Meeting of the Galvanizers Committee, sponsored by American Zinc Institute, Inc., St. Louis, Missouri, Apr. 21, 1954.

Reiffel: Beta-Ray-Excited Low Energy X-Ray Sources, Nucleonics, March 1955, pages 22 to 24.

Kereiakes et al.: "Beta-Excited X-Ray Sources . . .," Nucleonics, January 1958, pages 80 to 82.